United States Patent [19]

Demsky et al.

[11] 3,999,062
[45] Dec. 21, 1976

[54] SPECTROPHOTOMETER FOR DUAL MODE FLUORESCENCE ANALYSIS

[75] Inventors: Herbert M. Demsky, Wappingers Falls; Einar S. Mathisen, Poughkeepsie; Theodore R. Owen, Wappingers Falls; Alvin H. Tong, Poughkeepsie, all of N.Y.

[73] Assignee: International Business Machines Corporation, Armonk, N.Y.

[22] Filed: Oct. 1, 1975

[21] Appl. No.: 618,523

[52] U.S. Cl. .............................. 250/227; 250/233
[51] Int. Cl.² ...................... G02B 5/14; H01J 5/16; H01J 39/12
[58] Field of Search ............. 250/227, 231 SE, 233, 250/461 R, 461 B; 356/188, 212, 107, 161

[56] References Cited
UNITED STATES PATENTS

| | | | |
|---|---|---|---|
| 3,292,484 | 12/1966 | Clay | 356/188 |
| 3,354,319 | 11/1967 | Loewen et al. | 250/227 |

Primary Examiner—Alfred E. Smith
Assistant Examiner—David K. Moore
Attorney, Agent, or Firm—Douglas R. McKechnie

[57] ABSTRACT

A spectrophotometer includes a wide band radiant energy source and a detector for providing an output signal proportional to the intensity of the radiant energy received thereby. A light pipe system is divided into a reference path and a sample path. Such system coacts with a rotary assembly having a variable monochromatic filter located diametrically opposite to an opening through which radiant energy can freely pass. The remaining portions of the rotary assembly are opaque so that as the assembly turns, the sample and reference paths are serially energized by monochromatic energy and then by polychromatic energy. The sample path includes a sample illumination and collection system for illuminating a test sample and collecting the light reflected therefrom. The resultant output of the detector can be analyzed to determine the amount of fluorescence.

10 Claims, 3 Drawing Figures

SPECTROPHOTOMETER FOR DUAL MODE FLUORESCENCE ANALYSIS

FIELD OF THE INVENTION

This invention relates to spectrophotometry and, more particularly, to a spectrophotometer particularly useful for analyzing the fluorescent properties of a material by a dual mode technique.

BACKGROUND OF THE INVENTION

The dual or two mode method of analyzing materials for fluorescent properties by subjecting the materials to monochromatic and polychromatic excitation is a known method. It is described in "The Two-Mode Method for Measurement in Formulation with Fluorescent Colorants", by F. T. Simon, Journal of Color and Appearance, Vol. 1, No. 4, February/March 1972, pages 5–11. In accordance with this method, the test sample is alternately illuminated with monochromatic and polychromatic energy. The monochromatic energy is varied over a wide band and the reflectance of the material is determined across such band. Then, the sample is illuminated with polychromatic light and the light reflectance of the sample is again determined across the same bandwidth and the two results are compared to determine the degree of fluorescence.

In accordance with prior art techniques, spectrophotometers are available which operate both a monochromatic mode and a polychromatic mode. To perform the two mode technique, the measurements are first taken in the monochromatic mode, the spectrophotometer is then switched to the polychromatic mode and the further measurements are taken. Resultant data can then be analyzed either manually or by use of a computer.

One application where such a technique is particularly advantageous involves mixing paints or dyes to produce a resultant combination that matches a desired color. In attempting to predict a precise formula for producing the desired color, it has been customary to use the Kubelka-Munk formulas which are useful only in connection with the true spectralreflectance data without any distortions due to fluorenscence. The two mode technique provides such true spectral reflectance data.

SUMMARY OF THE INVENTION

One of the objects of the invention is to provide a spectrophotometer for analyzing fluorescent materials in accordance with the two mode technique.

Another object is to provide a spectrophotometer in which a test sample is excited or illuminated by a range of monochromatic energy and by polychromatic energy, without the need to switch the spectrophotometer between different modes of operation.

Still another object of the invention is to provide a spectrophotometer for analyzing fluorescent samples in accordance with the two mode technique, at relatively high speeds.

Briefly, in accordance with a preferred embodiment of the invention, a spectrophotometer has a wide band radiant energy source that is directed along two light pipe paths providing spectral data relative to the sample and to a reference. A rotary member intersects both light paths and includes a variable interference filter that transmits a narrow bandwidth of spectral energy over a wide range, the filter being disposed opposite to an opening through which light may freely pass. The energy which passes through the light pipes is fed to a detector providing an output signal. As the member rotates, the sample and reference paths are serially and alternately excited or provided with monochromatic and polychromatic energy so that the detector provides an output signal that can be analyzed to determine the fluorescent characteristics and true spectralreflectance of the material.

Other objects and advantages of the invention will be apparent from the following more particular description of a preferred embodiment of the invention taken in connection with the accompanying drawing, wherein.

Figure 1:
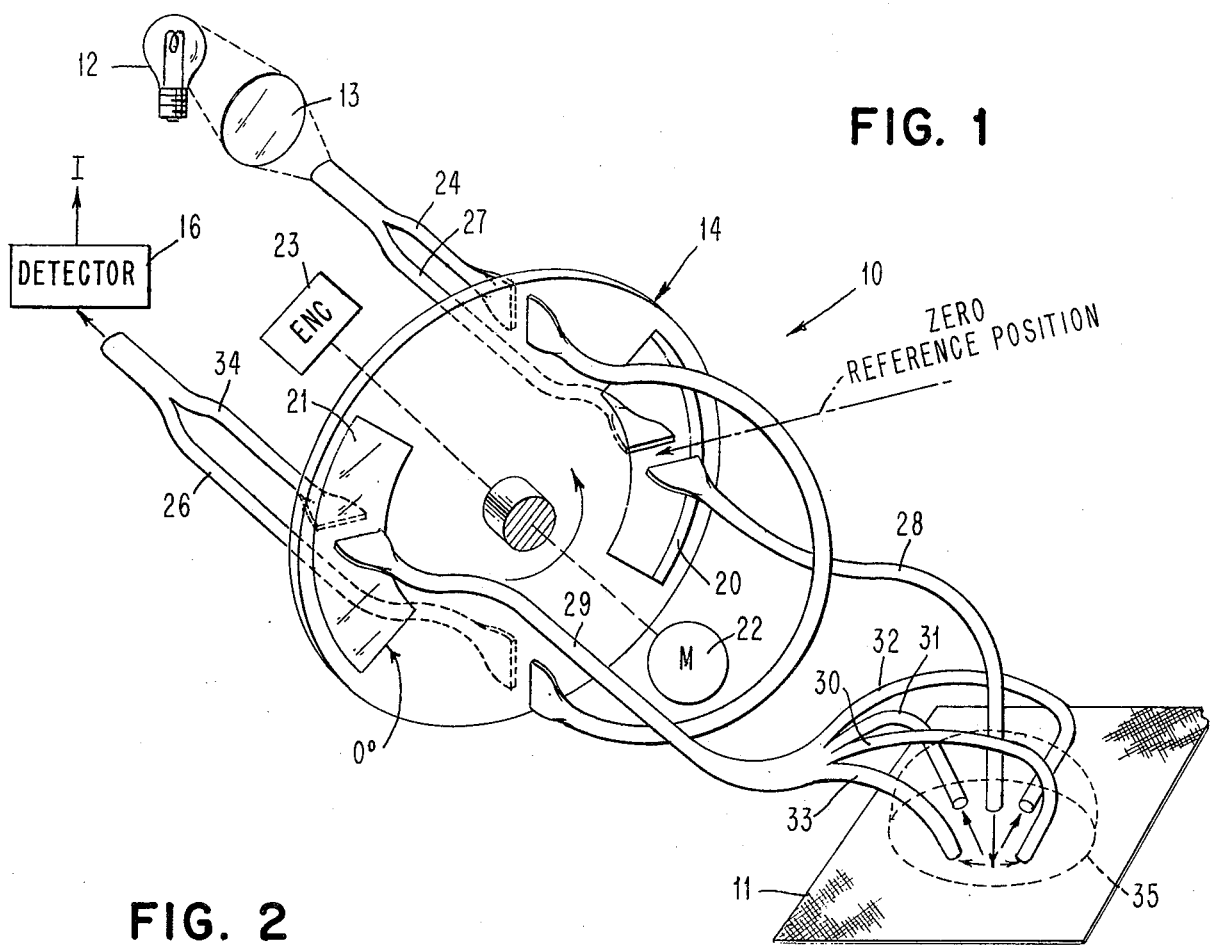
FIG. 1 is a schematic and perspective view of a spectrophotometer embodying the invention.

Referring now to the drawing, first to FIG. 1, there is illustrated a spectrophotometer 10 designed to analyze a test sample 11 for the fluorescent properties thereof. The test sample may be a piece of dyed textile or optically brightened paint, paper or plastic. Spectrophotometer 10 includes a wide band radiant energy source 12 that provides light in both the ultraviolet and visible regions. The collimating lens 13 focuses or concentrates light from source 12 onto the intake of a light pipe system which coacts with a rotary member 14. Part of the light pipe system includes an illumination and collecting system 15, the details of the system and of member 14 being described in detail below. The outlet end of the light pipe system is connected to a detector 16 that produces an output signal I proportional to the intensity of the radiant energy received by detector 16. Member 14 is driven by a motor 22 which may be either a continuously driven or a digitally or incrementally driven motor, the motor being also connected to a conventional encoder 23 that provides signals indicating the angular position of member 14 from a reference position, in a manner known in the art.

The light pipe system includes a series of fiber optic bundles arranged in two paths, a reference path and a sample path. The reference path includes a bundle 24 that receives light from source 12 and transmits it towards rotary member 14. The end of bundle 24 adjacent member 14 is flatened to provide an elongated relatively thin end that is aligned with a similarly shaped end of a bundle 25 disposed on the other side of member 14. This bundle in turn has its other end similarly shaped and aligned with the flatened end of bundle 26 that is connected to detector 16. The elongated ends of bundles 24, 25 and 26 are located in a plane that passes diametrically through the axis of member 14.

The sample path includes a bundle 27 that receives light from source 12 and transmits it toward member 14. A bundle 28 is disposed on the opposite side of member 14 and includes an end that forms part of system 15. In this connection, the end of 28 is the system is located at an angle perpendicular to the surface of sample 11. Four additional collection bundles 30 – 33 are disposed around the lower end of bundle 28 and at 45° to the surface so that light or energy from bundle 28 is reflected from the surface and part of such energy along with energy emitted due to fluorescense is picked up by these light collection bundles which form part of a fiber optic bundle 29. This bundle is aligned with a further bundle 34 connected to the detector. The light collection system may include a housing or hood 35 (shown in dotted outline for simplicity) which effectively shields stray light from the sample so as to not interfere with the measurements. Obviously, other types of light illumination and collection systems, such as conventional integrating spheres, may be used.

It will be appreciated that in the position shown in FIG. 1, light from source 12 travels through bundle 27, opening 20 and bundle 28 where it is reflected from sample 11. The light collected from system 15 then passes through bundle 29, filter 21 and bundle 34 to excite the detector so as to produce an output signal I proportional to the intensity. Because of the opaque nature of member 14, light from bundle 24 is prevented from travelling along the length of the reference path. In such a position, the sample is being excited or illuminated with a polychromatic radiant energy.

Member 14 is circularly shaped and is of an opaque material. It has an opening 20 and a similar opening in which is mounted a variable interference type filter 21. Both opening 20 and filter 21 are shaped in the forms of sectors of an annulus located at the same distance from the axis of rotation on diametrically opposite sides thereof and subtending angles of 90° each. The filter 21, opening 20 and remaining portions of member 14 provide a track that is alternately filtered, opaque, open and opaque. The flat ends of the fiber optic bundles adjacent member 14 are aligned with this track. As the member 14 rotates, it controls the transmission of radiant energy between the aligned adjacent ends of the fiber optic bundles.

Filter 21, as previously indicated, is a wedge-type interference filter whose filtering characteristic varies uniformly from one end to the other so as to provide a wide band of radiant energy transmitted thereby. The filter is located relative to a zero reference position (described below) whereby the angular position of the filter corresponds to a given nominal wavelength, such wavelengths being determined by the widths of the adjacent portions of aligned bundles. Thus, filter 21 acts as a monochromator.

Figure 2:
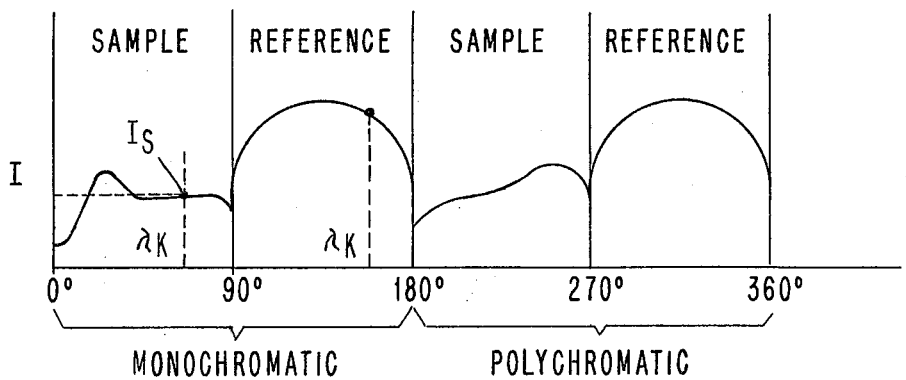
FIG. 2 is a graph illustrating the output of the detector.

The lower edge of filter 21, as viewed in FIG. 1, is arbitrarily designated at 0° and is used with the zero reference position whereby the wavelength being transmitted by filter 21 is proportional to the angular displacement of member 14. The zero reference position is determined when this 0° edge of filter 21 is aligned with the adjacent ends of bundles 27 and 28, at the "zero reference position" shown in FIG. 1. The operations of the system for one revolution of the wheel would now be described, relative to an example. Filter 21 is arranged so that the 0° end passes the shortest wavelength of energy and the longer wavelengths are passed at the other end. As member 14 rotates from a zero position through the first 90°, sample 11 will be illuminated by a continuously variable monochromatic light over the range established by the filter. The filter varies uniformly to provide a wavelength bandwidth range from $\lambda_l$ to $\lambda_m$. At any given wavelength, the light received by the light collection system includes not only that portion of the nominal wavelength that is reflected from the surface of 11 but it will also include those wavelengths that are generated due to the fluorescent properties of the material so that the light gathered by system 15 includes both the reflected and the fluorescent energy. The energy travels through bundle 29, through opening 20 and bundle 34 to detector 16 where the output I is proportional to the intensity of the incident radiant energy. Thus, as shown in FIG. 2 in an exemplary first 90° of rotation from the zero reference position, the output I may vary as indicated. The output signal at a given wavelength $\lambda_k$ is $I_s$. As a member rotates from 90° to 180°, the sample light path is blocked and the reference path is unblocked. Energy will pass along bundle 24, through filter 21, through bundle 25, opening 20 and bundle 26 to detector 16. As the wheel rotates, the output signal I will follow a locus of points as shown in FIG. 2 representing the spectral characteristics of the light source. Thus, for the first 180° of rotation, the sample and reference paths are exposed to the variable monochromatic light over a range of values. In a somewhat similar fashion, for the next 180°, the sample and reference paths are exposed to polychromatic light where such light would first pass through opening 20 and then through filter 21, instead of the reverse direction as during the monochromatic excitation.

It is to be appreciated that the output signal I of detector 16 can be fed into an automatic system for analyzing the data, such a system being similar to the type shown in U.S. Pat. No. 3,751,643 — Dill et al. Preferably, the signal I is converted by an analog-to-digital converter and fed to a computer in conjunction with the encoding signals so that a series of digital values are produced that when plotted, would form a locus similar to that shown in FIG. 2.

Figure 3:
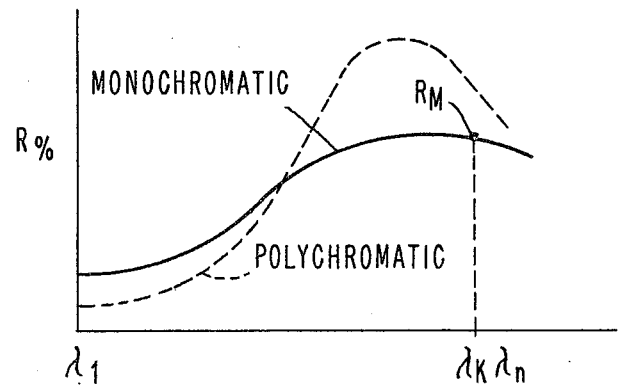
FIG. 3 is a graph of an exemplary analysis of the data.

To analyze the data, the respective monochromatic and polychromatic values are converted to the reflectance curves shown in FIG. 3. This is done, by the formula:

$$R_m = \frac{I_s}{I_r} \times 100$$

For this calculation, it is assumed that the spectrophotometer includes means compensating for dark current values of the system so as to produce the desired output signal I. $I_s$ and $I_r$ are the respective output signals corresponding to a given wavelength $\lambda_k$. In a similar manner, the reflectance values for the polychromatic excitation are calculated and plotted. FIG. 3 is merely exemplary for an understanding of the invention. Because of the nature of the fluorescence material, wherein fluorescent emissions at a higher wavelength are due to excitation at a lower wavelength, that portion of the polychromatic curve that is below the monochromatic curve represents the true spectral reflectance of the material and that portion of the monochromatic curve below the polychromatic curve represents the true spectral reflectance at the higher regions where emissions due to fluorescence are high.

It should be apparent to those skilled in the art that changes may be made in the details and arrangements of parts without departing from the spirit and scope of the invention as defined in the appended claims.

What is claimed is:
1. In a spectrophotometer for analyzing the fluorescent properties of a test sample, the combination comprising:
  a wideband radiant energy source;
  a radiant energy detector;
  a light pipe system comprising a reference path operative to conduct radiant energy from said source to said detector, and a sample path operative to conduct radiant energy to said detector;

a movable opaque member disposed across said reference and sample paths and having an opening therein for transmitting radiant energy therethrough and a variable interference filter mounted therein for transmitting a variable narrow bandwidth of monochromatic radiant energy;

and means for moving said member relative to said system;

said opening and said filter being movable through positions aligned with said paths to expose said sample and reference paths alternately to monochromatic and polychromatic radiant energy during movement of said member.

2. The combination of claim 1 wherein:

said opaque member is circular and rotatable, said opening and said filter being at the same radial distance from the axis of rotation.

3. The combination of claim 2 wherein:

said opening and said filter are located in diametrically opposite positions and extend around different quadrants of said member.

4. The combination of claim 2 wherein:

said filter is uniformly graduated from one side of its quadrant to the other whereby the wavelength of the monochromatic energy transmitted thereby is proportional to the angular position thereof.

5. The combination of claim 4 comprising:

encoding means connected for rotation with said member providing signals at predetermined angular displacements.

6. In a spectrophotometer for analyzing the fluorescence of a test sample, the combination of:

a source of polychromatic radiant energy having a bandwidth including both ultraviolet and visible portions;

a radiant energy detector providing an output signal proportional to the intensity of radiant energy received thereby;

a movable member having a track therein comprising a variable filter for transmitting a variable wavelength of monochromatic radiant energy, a section for transmitting both monochromatic and polychromatic radiant energy, and an opaque portion for blocking the transmission of any radiant energy;

first fiber optic means having a first end disposed to receive light from said source and a second end disposed adjacent to one side of said track;

second fiber optic means having a first end disposed on the other side of said track and aligned with said second end of said first fiber optic means to receive radiant energy therefrom transmitted through said filter and said section when aligned therewith, said second fiber optic means having a second end disposed to illuminate said test sample with the radiant energy received by said second fiber optic means;

third fiber optic means having a first end for receiving radiant energy reflected from said sample and emitted by said sample due to fluorescence thereof, and a second end disposed adjacent one side of said track;

fourth fiber optic means having a first end aligned with said second end of said third fiber optic means on the opposite side of said track for receiving radiant energy transmitted through said filter and said section when aligned therewith, and a second end connected to said detector;

fifth fiber optic means having a first end disposed to receive radiant energy from said source and a second end disposed adjacent to said track;

sixth fiber optic means having first and second ends disposed adjacent to said track, said first end thereof being aligned with said second end of said fifth fiber optic means on the opposite side of said track for receiving radiant energy therefrom when aligned with said filters and said section;

seventh fiber optic means having first and second ends, said first end thereof being aligned with said second end of said sixth fiber optic means on the opposite side of said track, said second end thereof being connected to said detector;

and means for moving said member and track relative to said fiber optic means;

said track and said ends adjacent thereto being arranged whereby such movement:

during one period aligns said filter with adjacent ends of said first and second fiber optic means to illuminate said sample with monochromatic energy, aligns said section with adjacent ends of said third and fourth fiber optic means to transmit radiant energy from said sample to said detector, and aligns said opaque portion with said fifth, sixth and seventh fiber optic means;

during another period aligns said section with adjacent ends of said first and second fiber optic means to illuminate said sample with polychromatic energy, aligns said filter with adjacent ends of said third and fourth fiber optic means to transmit only a monochromatic portion of radiant energy from said sample to said detector, and aligns said opaque portion with said fifth, sixth and seventh fiber optic means;

and during at least one more period aligns said opaque portion with adjacent ends of said first, second, third and fourth fiber optic means, and aligns said filter and said section with adjacent ends of said fifth, sixth and seventh fiber optic means to provide a reference for determining the reflectance from said sample.

7. The combination of claim 6 wherein:

said movable member is rotatable;

and said track is concentric to the axis of rotation.

8. The combination of claim 7 wherein:

said track comprises said filter located in one quadrant thereof, said section located in another quadrant thereof opposite to said one quadrant, and said opaque portion located between said one and said another quadrants.

9. The combination of claim 7 wherein:

said filter is uniformly graduated from one end to the other thereof along said track, whereby the wavelength of the monochromatic energy transmitted therethrough is proportional to the angular position thereof.

10. The combination of claim 9 comprising:

an encoder connected for rotation with said member and providing output signals indicative of the angular position thereof.

* * * * *